United States Patent
Mouskis

(10) Patent No.: US 9,950,804 B2
(45) Date of Patent: Apr. 24, 2018

(54) RECEPTION COUPLING

(71) Applicant: FLIGHT REFUELLING LIMITED, Dorset (GB)

(72) Inventor: Christopher Mouskis, Dorset (GB)

(73) Assignee: FLIGHT REFUELING LIMITED, Wimborne, Dorset (GB)

( * ) Notice: Subject to any disclaimer, the term of this patent is extended or adjusted under 35 U.S.C. 154(b) by 43 days.

(21) Appl. No.: 14/785,107

(22) PCT Filed: Mar. 26, 2014

(86) PCT No.: PCT/GB2014/050951
§ 371 (c)(1),
(2) Date: Oct. 16, 2015

(87) PCT Pub. No.: WO2014/170635
PCT Pub. Date: Oct. 23, 2014

(65) Prior Publication Data
US 2016/0083105 A1    Mar. 24, 2016

(30) Foreign Application Priority Data
Apr. 19, 2013 (GB) ................ 1307198.0

(51) Int. Cl.
*B64D 39/06* (2006.01)

(52) U.S. Cl.
CPC .................. *B64D 39/06* (2013.01)

(58) Field of Classification Search
CPC ......... B64D 39/00; B64D 39/06; F16L 29/02; F16L 37/32
See application file for complete search history.

(56) References Cited

U.S. PATENT DOCUMENTS

| | | | | |
|---|---|---|---|---|
| 2,852,280 A | | 9/1958 | Worlidge | |
| 2,946,605 A | * | 7/1960 | Mosher | B64D 39/06 137/614.03 |
| 3,192,940 A | * | 7/1965 | Wiersholm | B64D 39/06 137/220 |
| 3,348,575 A | * | 10/1967 | Simak | F16L 37/23 137/614.05 |
| 3,352,332 A | * | 11/1967 | Swatek | B64D 39/06 137/614.04 |
| 3,380,469 A | * | 4/1968 | Salerno | B64D 13/02 137/219 |

(Continued)

FOREIGN PATENT DOCUMENTS

| | | |
|---|---|---|
| GB | 2449503 A | 11/2008 |
| GB | 2469789 A | 11/2010 |

OTHER PUBLICATIONS

International Search Report for PCT/GB2014/050951 dated May 20, 2014.
Search Report for GB1307198.0 dated Oct. 3, 2013.

*Primary Examiner* — Joseph W Sanderson
(74) *Attorney, Agent, or Firm* — Heslin Rothenberg Farley & Mesiti P.C.; Victor A. Cardona, Esq.

(57) ABSTRACT

A reception coupling for air-to-air refuelling has a main body and a fuel passage. A moveable valve member is provided for opening and closing the fuel passage. A chamber is separate from the fuel passage. A portion of the valve member can be accommodated in the chamber as the valve member moves toward an open position, shielding that portion from effects of pressure in the fuel passage.

20 Claims, 6 Drawing Sheets

(56) References Cited

U.S. PATENT DOCUMENTS

| | | | | |
|---|---|---|---|---|
| 3,475,001 | A | * | 10/1969 | Hieber .................. B64D 39/06 |
| | | | | 137/614.03 |
| 3,586,033 | A | | 6/1971 | Hieber |
| 3,587,678 | A | * | 6/1971 | Hieber .................. B64D 39/06 |
| | | | | 141/346 |
| 3,851,852 | A | | 12/1974 | Blanchard et al. |
| 3,874,410 | A | | 4/1975 | Clark |
| 3,976,100 | A | * | 8/1976 | Souslin ................. B64D 39/06 |
| | | | | 137/599.01 |
| 9,352,847 | B2 | * | 5/2016 | Mouskis ................ B64D 39/06 |
| 2010/0243061 | A1 | * | 9/2010 | Mouskis ............. G05D 16/106 |
| | | | | 137/1 |
| 2013/0333803 | A1 | * | 12/2013 | Mouskis ............. G05D 16/106 |
| | | | | 141/349 |
| 2016/0096631 | A1 | * | 4/2016 | Reinholdt ............ G05D 16/106 |
| | | | | 137/613 |

\* cited by examiner

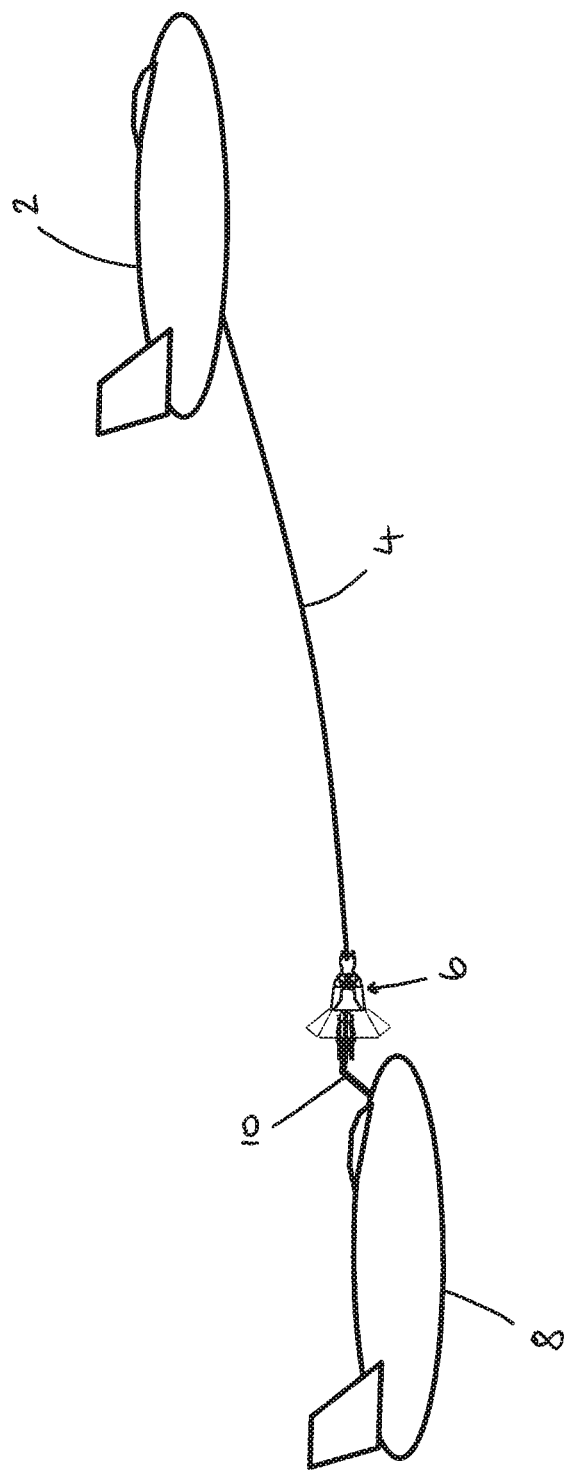

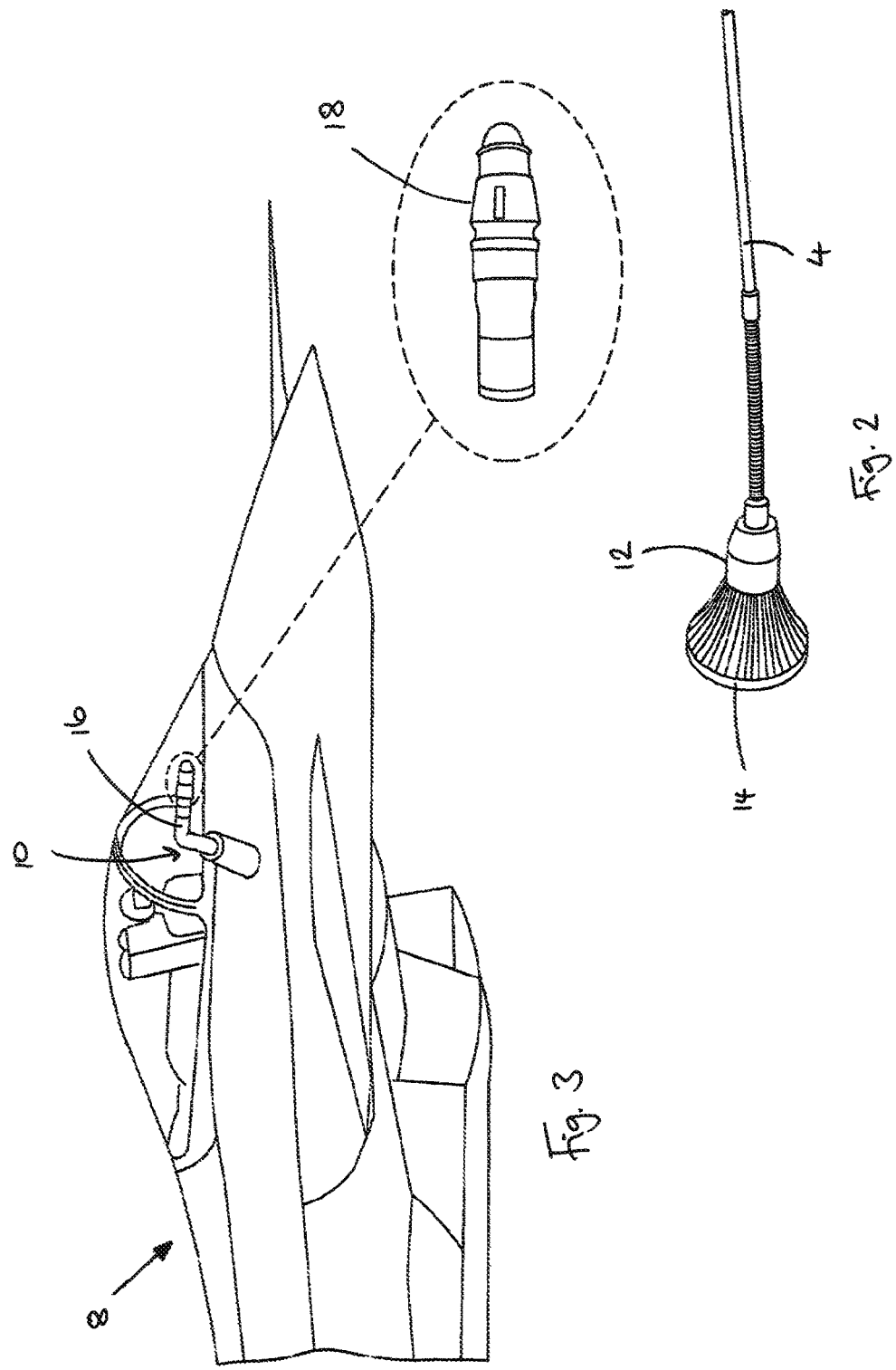

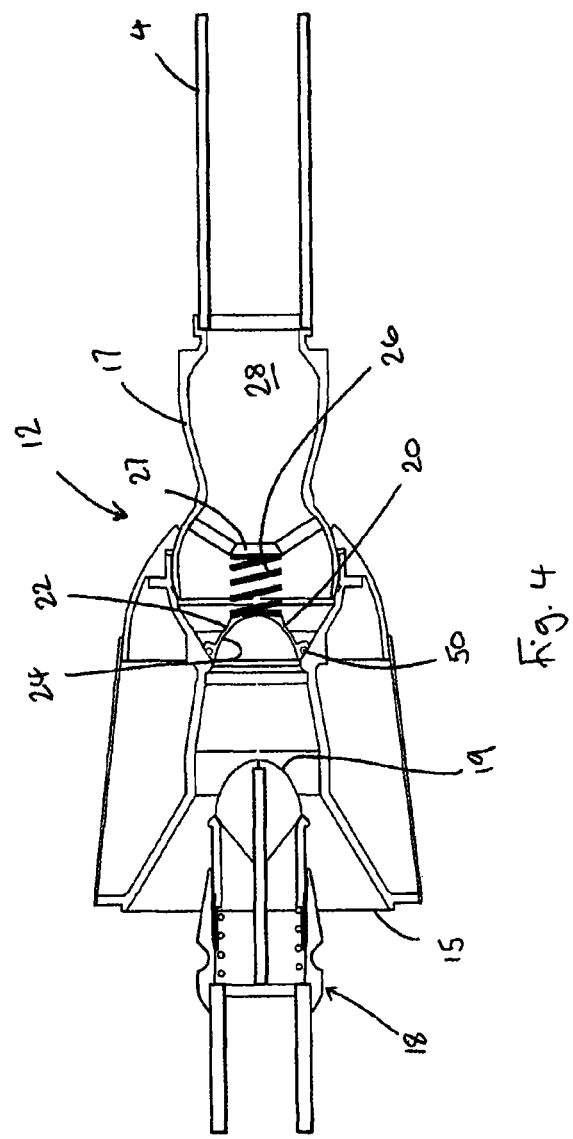
PRIOR ART

RECEPTION COUPLING

CROSS REFERENCE TO RELATED APPLICATIONS

This application is a national stage filing under section 371 of International Application No. PCT/GB2014/050951, filed on Mar. 26, 2014, and published in English on Oct. 23, 2014, as WO 2014/170635 A1 and claims priority of Great Britain application GB 1307198.0 filed on Apr. 19, 2013, the entire disclosure of these applications being hereby incorporated herein by reference.

The present invention relates to reception couplings for air-to-air refuelling.

BACKGROUND.

In air-to-air refuelling, a tanker aircraft trails a refuelling hose, to the trailing end of which is attached a drogue assembly comprising a reception coupling and drogue canopy. The drogue canopy stabilises the refuelling hose trailing from the tanker aircraft, and provides a drag force.

A receiver aircraft is equipped with a refuelling probe which projects from the receiver aircraft. The refuelling probe comprises a nozzle disposed at the forward end of the refuelling probe and arranged to engage with the reception coupling. The reception coupling comprises an opening for receiving the refuelling probe.

On engagement of the refuelling probe with the reception coupling, the refuelling probe acts against the drag force provided by the drogue assembly. Following engagement a fuel flow path is established between the tanker aircraft and the receiver aircraft via the refuelling hose, the drogue assembly, and the refuelling probe.

The reception coupling comprises a fuel passage therethrough providing a channel for fuel for refuelling a receiver aircraft, and a valve for opening and closing the fuel passage to prevent fuel freely flowing out from the refuelling hose when the refuelling probe of a receiver aircraft is not engaged with the reception coupling. Conventional reception couplings comprise a poppet-type valve.

Fuel in the refuelling hose is pressurised to achieve a high flow rate of fuel to the receiver aircraft. The fuel pressure tends to act on a surface of the valve urging it towards a closed position.

On engagement of the refuelling probe with the reception coupling, the refuelling probe pushes against the valve with an engagement force to open the fuel passage. The engagement force must be sufficient to overcome the closing force on the valve caused by the fuel pressure. Engagement forces (loads) can therefore be high.

In some tanker refuelling systems the fuel pressure within the refuelling hose and the reception coupling can be reduced to reduce the engagement loads. However, this tends to lead to a lower flow rate of fuel to the receiver aircraft.

Some tanker refuelling systems are not capable of reducing the fuel pressure within the refuelling hose and the reception coupling, leading to high engagement loads, and requiring corresponding high relative speeds between the receiver aircraft and the tanker aircraft to ensure full engagement. This can cause issues with larger receiver aircraft due to the distance required by the aircraft to slow down following engagement.

For all aircraft, high engagement load (i.e. high relative engagement speed) is a constraint resulting in reduced precision and probability of full engagement.

The present invention is aimed at addressing such issues.

SUMMARY OF THE INVENTION

According to a first aspect of the present invention, there is provided a reception coupling for air-to-air refuelling comprising a main body comprising a fuel passage for allowing fuel to flow through the reception coupling, and a valve member which is movable, under action of a receiver aircraft probe, in an upstream direction from a first position in which the fuel passage is closed to a second position in which the fuel passage is open for allowing air-to-air refuelling, the reception coupling further comprising a chamber defined by a chamber wall, which chamber is separate from the fuel passage and within which a portion of the valve member can be accommodated as the valve member moves towards the second position, so shielding said portion of the valve member from effects of pressure in the fuel passage which would tend to resist movement of the valve member towards the second position.

This enables the refuelling system to be pressurised according to the requirements of the aircraft to be refuelled, and allows engagement of the receiver aircraft with the reception coupling to be made at the most appropriate speed irrespective of the pressure of the fuel used for refuelling the receiver aircraft.

The chamber wall may be disposed in the fuel passage. The chamber wall may be mounted in the fuel passage by at least one radially extending arm. In this way, the chamber wall may be disposed in the fuel passage without blocking the fuel passage.

The chamber wall may comprise at least one aperture. The chamber may be vented by the aperture, allowing fluid to move out of the chamber, as the portion of the valve member moves into the chamber.

The chamber may be in fluid communication with the atmosphere. The chamber may be in fluid communication with the atmosphere via the aperture. The chamber may be in fluid communication with the atmosphere via at least one channel extending between the aperture and the atmosphere. In other words, a channel may extend between an aperture and atmosphere, or a plurality of channels may extend between one or more apertures and atmosphere.

The channel may pass through the radially extending arm. The plurality of channels may pass through one or more of the radially extending arms. In other words, more than one radially extending arm may have a channel passing therethrough, or a plurality of channels may pass through a radially extending arm, or some combination of these.

The valve member may comprise a sleeve valve. Part of the portion of the valve member which is accommodated within the chamber as the valve member moves towards the second position may be accommodated within the chamber in the first position.

The reception coupling may comprise a first seal to seal the chamber from the fuel passage, the first seal being disposed on one of the valve member and the chamber wall and arranged to seal against the other of the valve member and the chamber wall. The valve member may be circular in axial cross-section. The first seal may be a circumferential seal.

The main body of the reception coupling may comprise a valve seat, and the valve member may comprise a sealing portion arranged to seal against the valve seat when the valve member is in the first position. The sealing portion preferably comprises a second seal.

A surface of the chamber wall facing the fuel passage may be shaped to minimise disturbance to fuel flow through the fuel passage. A portion of the surface of the chamber wall facing the fuel passage is preferably smooth. A portion of the surface of the chamber wall facing the fuel passage may be chamfered.

The reception coupling may comprise a biassing means for biassing the valve member towards the first position. The biassing means may comprise a resilient member. Preferably the biassing means is a spring. Preferably the spring is a helical spring. The biassing means may be disposed in the chamber. The biassing means may be arranged to act between an inner surface of the chamber wall and the valve member. The biassing means may be mounted to the chamber wall. The biassing means may act on a surface of the valve member facing the chamber.

The surface of the valve member facing the chamber may comprise a recessed portion for locating the biassing means on the surface of the valve member. The surface of the valve member facing the chamber may comprise a protruding portion for locating the biassing means on the surface of the valve member.

According to a second aspect of the present invention, there is provided a hose and drogue arrangement for air-to-air refuelling comprising a reception coupling as defined above.

The reception coupling according to the second aspect may comprise any one of, or any combination of, the additional features described above in relation to the reception coupling according to the first aspect defined above.

According to a third aspect of the present invention, there is provided a tanker aircraft comprising a hose and drogue arrangement for air-to-air refuelling, the hose and drogue arrangement comprising a reception coupling as defined above.

The reception coupling according to the third aspect may comprise any one of, or any combination of, the additional features described above in relation to the reception coupling according to the first aspect defined above.

According to a fourth aspect of the present invention, there is provided a reception coupling for air-to-air refuelling comprising a main body comprising a fuel passage for allowing fuel to flow through the reception coupling, and a valve member which is movable, under action of a receiver aircraft probe, in an upstream direction from a first position in which the fuel passage is closed to a second position in which the fuel passage is open for allowing air-to-air refuelling, the reception coupling further comprising a chamber defined by a chamber wall, which chamber is separate from the fuel passage and within which a portion of the valve member can be accommodated as the valve member moves towards the second position, so shielding said portion of the valve member from effects of pressure in the fuel passage which would tend to resist movement of the valve member towards the second position, wherein the reception coupling comprises a first seal to seal the chamber from the fuel passage, the first seal being disposed on one of the valve member and the chamber wall and arranged to seal against the other of the valve member and the chamber wall.

According to a fifth aspect of the present invention, there is provided a reception coupling for air-to-air refuelling comprising a main body comprising a fuel passage for allowing fuel to flow through the reception coupling and a valve member which is movable, under action of a receiver aircraft probe, in an upstream direction from a first position in which the fuel passage is closed to a second position in which the fuel passage is open for allowing air-to-air refuelling, the reception coupling further comprising a chamber defined by a chamber wall, which chamber is separate from the fuel passage and within which a portion of the valve member can be accommodated as the valve member moves towards the second position, so shielding said portion of the valve member from effects of pressure in the fuel passage which would tend to resist movement of the valve member towards the second position, wherein the reception coupling comprises at least one radially extending arm and the chamber wall is mounted within the fuel passage by the at least one radially extending arm, the at least one radially extending arm comprises at least one channel passing therethrough, and the chamber wall comprises an aperture, through which aperture the chamber is in fluid communication with the at least one channel, and wherein the at least one channel is in fluid communication with the atmosphere.

Embodiments of the present invention will now be described, by way of example only, with reference to the accompanying drawings in which:

BRIEF DESCRIPTION OF THE DRAWINGS

FIG. 1 shows an air-to-air refuelling arrangement;

FIG. 2 shows a partial view of a refuelling hose and drogue arrangement;

FIG. 3 shows a receiver aircraft equipped to receive fuel during air-to-air refuelling;

FIG. 4 shows a conventional reception coupling in a closed configuration and a portion of a refuelling probe;

DETAILED DESCRIPTION

Figure 5:
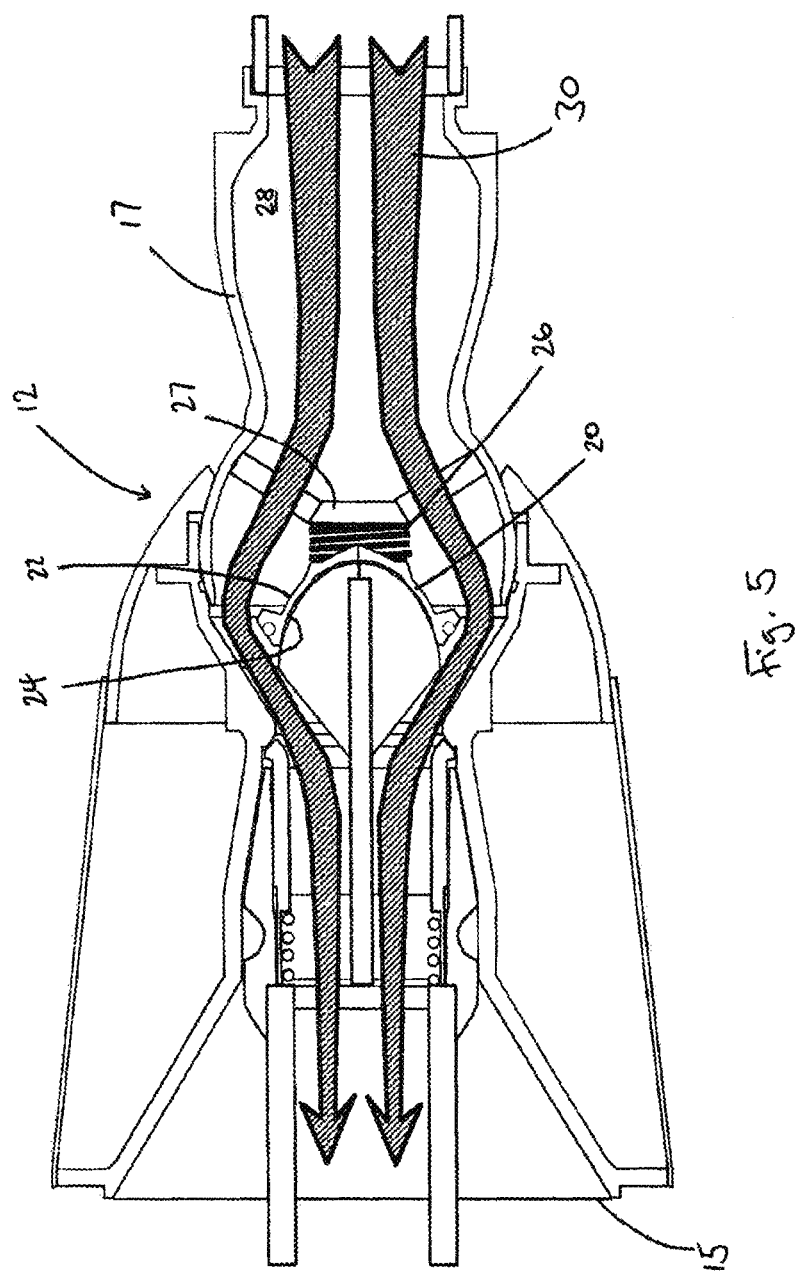
FIG. 5 shows the reception coupling of FIG. 4 in an open configuration.

FIGS. 1 to 3 show a typical air-to-air refuelling arrangement of the type mentioned in the introduction. In such an arrangement a tanker aircraft 2 trails a refuelling hose 4 and a drogue assembly 6, which are used in refuelling a receiver aircraft 8 comprising a refuelling probe 10. The drogue assembly 6 can comprise a conventional reception coupling 12, or a reception coupling 12' embodying the present invention (as will be described in more detail below), and a drogue canopy 14 provided around the reception coupling 12/12'. The refuelling probe 10 comprises a main probe body 16 and a nozzle 18.

FIGS. 4 and 5 show a conventional reception coupling 12 and its interaction with the probe 10 in more detail. The reception coupling 12 comprises an opening 15 for receiving a refuelling probe 10, a main body 17 comprising a fuel passage 28, and a poppet-type valve member 20 disposed in the fuel passage 28. The valve member 20 is arranged to close the fuel passage 28 when no receiver aircraft 8 is engaged with the reception coupling 12 to prevent fuel freely flowing out therefrom.

The valve member 20 is movable between a first position (shown in FIG. 4) in which the fuel passage 28 is closed and a second position (shown in FIG. 5) in which the fuel passage 28 is open for allowing refuelling of a receiver aircraft 8. The valve member 20 is movable from the first position to the second position, in an upstream direction, on insertion of a refuelling probe 10 through the opening 15, to provide a fuel flow path through the reception coupling 12.

The valve member 20 comprises a forward-facing surface 22 and a nozzle-engaging portion 24. Here, forward-facing means generally facing a direction in which the reception coupling 12 will move in flight when deployed from a tanker aircraft 2.

A nozzle tip 19 of the nozzle 18 has a rounded exterior profile and the nozzle-engaging portion 24 is shaped to correspond to the outer surface profile of the nozzle tip 19 such that when the nozzle 18 passes into the reception coupling 12 through the opening 15, the nozzle tip 19 is seated against the nozzle-engaging portion 24 of the valve member 20.

As the nozzle 18 is pushed into the reception coupling 12, the nozzle tip 19 pushes against the nozzle-engaging portion 24 and moves the valve member 20 from the first position towards the second position, creating a flow path between the valve member 20 and the inner walls of the fuel passage 28 and allowing fuel within the refuelling hose 4 and fuel passage 28 to pass around the valve member 20 and into the nozzle 18 so as to refuel the receiving aircraft 8. The fuel flow path is indicated in FIG. 5 by arrow 30.

The main body 17 comprises a valve seat against which a portion of the valve member 20 abuts in the first position so as to close the fuel passage 28. In the reception coupling 12 shown in FIG. 4, the valve seat is a portion of an internal wall of the fuel passage 28. A seal 50 is provided at a sealing portion of the valve member 20 to effectively seal the fuel passage 28.

A helical spring 26 is provided as a biasing means disposed within the fuel passage 28 for biasing the valve member 20 towards the first position. The helical spring 26 acts between a plate 27, which is mounted in the fuel passage 28 by arms, and the forward-facing surface 22 urging the valve member 20 towards the first position.

From FIG. 4, it can be seen that the forward-facing surface 22 of the valve member 20 is exposed to the fuel pressure in the fuel passage 28 of the reception coupling 12. The force thus produced on the valve member 20 as a result of this pressure will tend to urge the valve member 20 towards the first position, i.e. closing the valve.

On engagement of the nozzle 18 with the reception coupling 12, the relative speeds of the receiver aircraft 8 and the tanker aircraft 2 (and therefore the reception coupling 12) mean that an engagement force is produced between the nozzle 18 and the reception coupling 12. This is also termed an engagement load.

The engagement force must be sufficient to overcome both the biasing force on the valve member 20 produced by the helical spring 26, and the force on the valve member 20 produced by the pressure in the fuel passage 28, in order to move the valve member 20 in an upstream direction to allow refuelling of the receiver aircraft 8.

On disengagement of the refuelling probe 10 from the reception coupling 12, the nozzle 18 will be withdrawn from the reception coupling 12 and the valve member 20 will be urged across the fuel flow path created in the fuel passage 28 by helical spring 26, thus closing the fuel passage 28. This shuts off the flow of fuel through the reception coupling 12.

Figure 6:
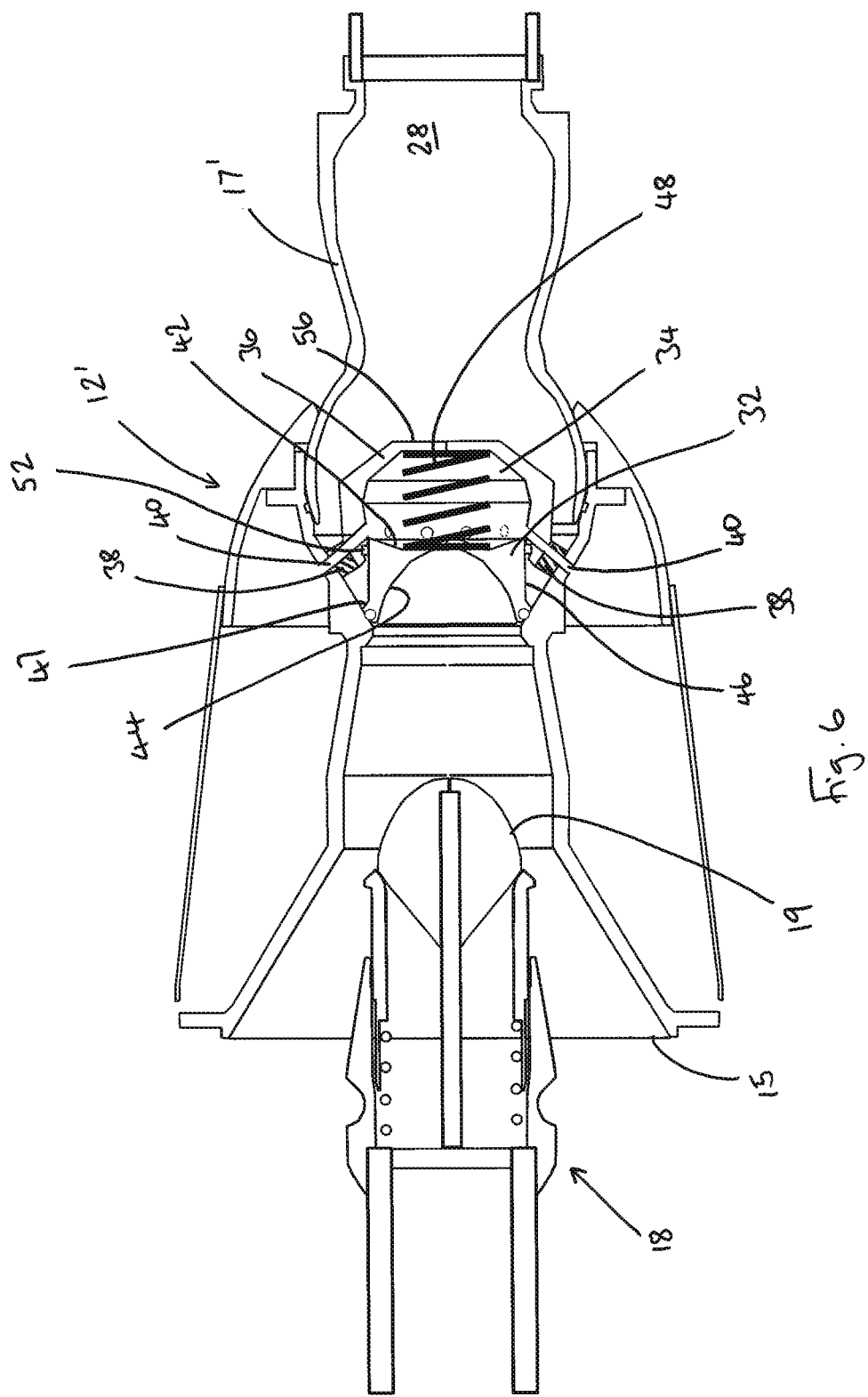
FIG. 6 shows a reception coupling embodying the present invention in a closed configuration and a portion of a refuelling probe.
Figure 7:
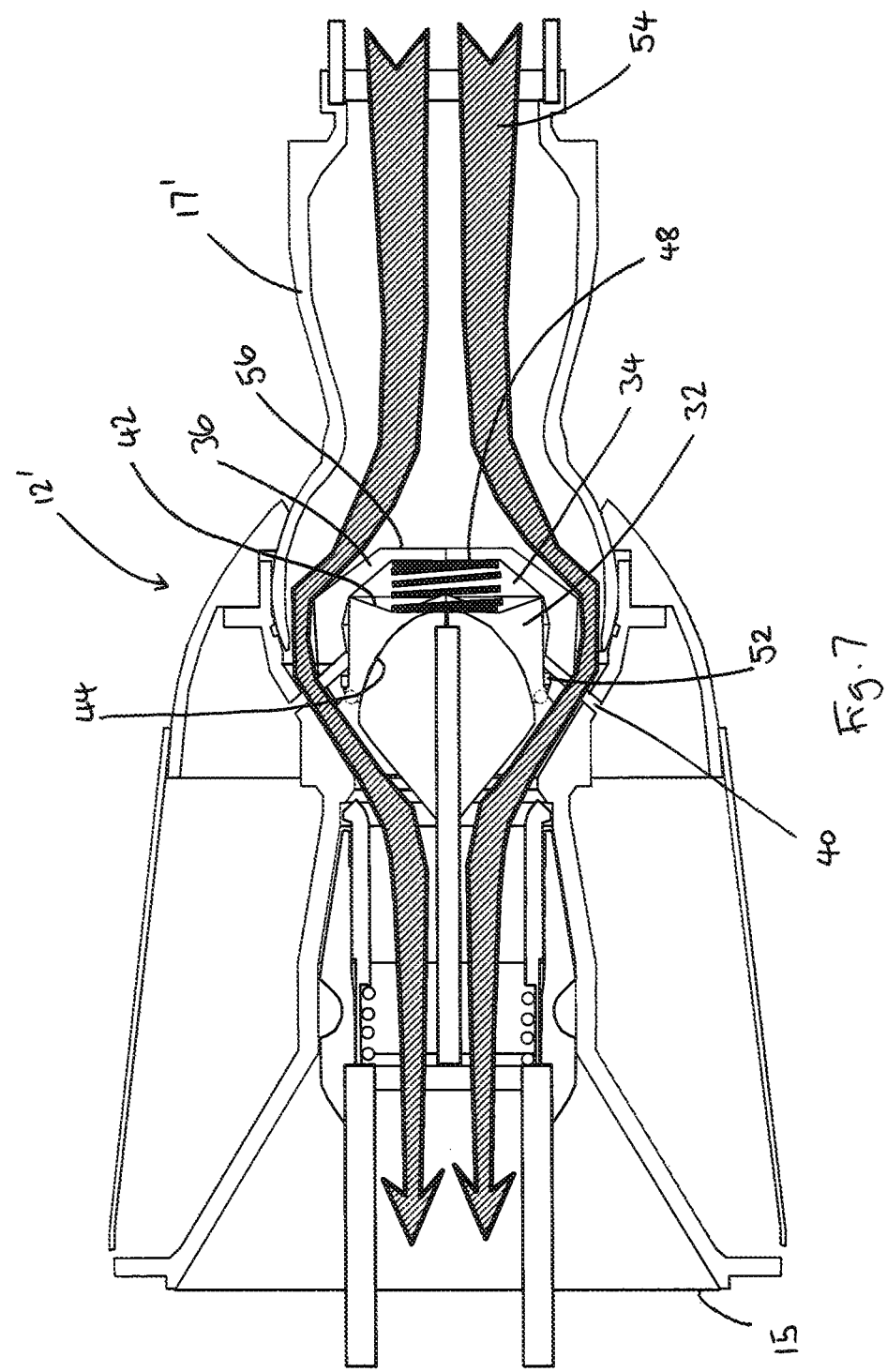
FIG. 7 shows the reception coupling of FIG. 6 in an open configuration.

As mentioned in the introduction, the engagement load created by the fuel pressure acting on the valve during engagement can cause problems. FIGS. 6 and 7 show an improved form of reception coupling 12' which embodies the present invention. In the improved reception coupling 12', the tendency of pressure in the fuel passage 28 to resist movement of the valve member towards the second position is reduced by shielding a portion of the valve member from the pressure.

The improved reception coupling 12' shown in FIGS. 6 and 7 is similar in most respects to the conventional reception coupling 12 shown in FIGS. 4 and 5 and described above. The differences reside in the configuration of the valve member 32 and the provision of a chamber 34 within the fuel passage 28, as described in more detail below. The same reference numerals have been used in FIGS. 6 and 7 to indicate the parts of the improved reception coupling 12' and nozzle 18 which are in common with the reception coupling 12 and nozzle 18 shown in FIGS. 4 and 5. A detailed description of the similar parts is omitted for brevity.

The internal dimensions of the improved reception coupling 12' are chosen such that the reception coupling 12' can be used with existing refuelling probes 10 and refuelling nozzles 18 whilst retaining the advantages described herein.

The improved reception coupling 12' comprises a main body 17' comprising the fuel passage 28 and a valve member 32 for opening and closing the fuel passage 28. Similar to the conventional reception coupling 12 described above, the valve member 32 of the improved reception coupling 12' is movable (under action of the probe 10) in an upstream direction from a first position (see FIG. 6) in which the fuel passage 28 is closed to a second position (see FIG. 7) in which the fuel passage 28 is open for allowing refuelling of a receiver aircraft 8.

As shown in FIGS. 6 and 7, the reception coupling 12' comprises a chamber 34, defined by a chamber wall 36, which is disposed in, but is separate from, the fuel passage 28. In the embodiment shown in FIGS. 6 and 7, there is no fluid communication between the chamber 34 and the fuel passage 28. Thus pressure variations in the fuel passage 28 will not be reproduced within the chamber 34.

The chamber wall 36 is mounted in the fuel passage 28 by a plurality of radially extending arms 38 which extend across but do not block the fuel passage 28. The arms may be considered to be arranged as a 'spider' in the current embodiment. A single radially extending arm may alternatively be provided.

A portion of the valve member 32 is accommodated within the chamber 34 as the valve member 32 moves towards the second position. This shields that portion of the valve member 32 from pressure in the fuel passage 28.

The valve member 32 comprises a forward-facing surface 42, a nozzle-engaging portion 44, a generally cylindrical outer portion 46, and a flanged portion 47. The portion of the valve member 32 accommodated within the chamber 34 as the valve member 32 moves towards the second position comprises a portion of the generally cylindrical outer portion 46.

Part of the portion of the valve member 32 which is accommodated within the chamber 34 as the valve member 32 moves towards the second position is accommodated within the chamber 34 in the first position, as shown in FIG. 6. Thus the accommodated portion of the valve member 32 is also shielded from pressure in the fuel passage 28 in the first position.

Channels 40 are provided which extend through the radially extending arms 38 between the chamber 34 and the atmosphere. Thus, in this embodiment the chamber 34 will generally be at atmospheric pressure.

As the chamber 34 is vented (here by the channels 40), fluid within the chamber 34 can move out of the chamber 34 as the valve member 32 moves into the chamber 34. This assists in preventing a build-up of pressure in the chamber 34 which could oppose the continued movement of the valve member 32 into the chamber 34.

In the second position, the valve member 32 is spaced from the internal walls of the fuel passage 28, creating a flow path around the chamber wall 36 and past the valve member 32 (as shown by arrow 54 in FIG. 7), i.e. creating a flow path through the improved reception coupling 12', through the nozzle 18 and into the receiver aircraft 8.

In the first position, shown in FIG. 6, the generally cylindrical outer portion 46 is at least partly exposed to the fuel passage 28, whereas the forward-facing surface 42 is shielded from effects of pressure in the fuel passage 28 by the chamber wall 36. The flanged portion 47 is also exposed to the fuel passage 28. Pressure in the fuel passage 28 will tend to result in a force on the exposed portion of the valve member 32, i.e. the generally cylindrical outer portion 46. However, this is in a direction which is generally perpendicular to the opening direction of the valve member 32. Pressure in the fuel passage 28 will also tend to result in a force on the flanged portion 47 parallel to the opening direction of the valve member 32. However, as the area of the flanged portion 47 is small, this force will be correspondingly small. This force will be much smaller than the force on the forward-facing surface 22 of the valve member 20 of the conventional reception coupling 12 exposed to the same pressure.

In the second position, shown in FIG. 7, the forward-facing surface 42 is again shielded by the chamber wall 36, and the generally cylindrical outer portion 46 is further received within the chamber 34 compared to in the first position.

This reduces the tendency of pressure in the fuel passage 28 to resist movement of the valve member 32 towards the second position, i.e. opening of the valve. In other words, the shielding effect of the chamber wall 36 reduces the tendency of pressure in the fuel passage 28 to cause a force on the valve member 32 in a direction opposite to the opening direction of the valve member 32.

When the valve member 32 of the improved reception coupling 12' is in the first position, as shown in FIG. 6, both the forward-facing surface 42 and the nozzle-engaging portion 44 of the valve member 32 are generally exposed to atmospheric pressure. Thus the net force acting on the valve member 32 produced by the pressure acting on the forward-facing surface 42 and the nozzle-engaging portion 44 will be very low or approximately zero. Thus, to open the valve member 32, the nozzle 18 must exert a forwardly-directed force on the valve member 32 so as to overcome the biasing force of the helical spring 48, but does not have to overcome an additional force caused by fuel pressure in the fuel passage 28 directly acting on the forward-facing surface 42 of the valve member 32.

Hence the engagement load is not sensitive to pressure in the fuel passage 28 and the force required to open the valve can be configured such that engagement of the receiver aircraft 8 with the improved reception coupling 12' can be made at the most appropriate speeds (i.e. engagement loads) without requiring the pressure in the fuel passage 28 and the refuelling hose 4 to be changed to accommodate different receiver aircraft 8. Thus the pressure in the fuel passage 28 and refuelling hose 4 can be optimised to maximise the flow rate of fuel from the tanker aircraft 2 to the receiver aircraft 8.

The nozzle-engaging portion 44 of the improved reception coupling 12' is arranged to interact with the nozzle tip 19 as described above with reference to FIG. 4. The conventional nozzle-engaging portion 24 has a rearwardly-extending profile that generally follows the shape of the nozzle tip 19 and is exposed to pressure in the fuel passage 28. In contrast, the nozzle-engaging portion 44 of the improved reception coupling 12' has a rearwardly-extending profile that follows the shape of a cylinder (i.e. the generally cylindrical outer portion 46) and is at least partially receivable into the chamber 34.

In the embodiment shown in FIGS. 6 and 7, the valve member 32 can be considered a sleeve valve.

As with the conventional reception coupling 12, a biasing means is disposed within the improved reception coupling 12' for urging the valve member 32 towards the first position. In the embodiment shown in FIGS. 6 and 7, the biasing means is a helical spring 48. In contrast with the conventional reception coupling 12, in the reception coupling 12' shown in FIGS. 6 and 7 the helical spring 48 is disposed within the chamber 34, and acts between an inner surface of the chamber wall 36 and the forward-facing surface 42 of the valve member 32. In the current embodiment, the helical spring 48 is mounted to the chamber wall 36 within the chamber 34.

The forward-facing surface 42 has a surface profile for aiding in the location of the helical spring 48 against the forward-facing surface 42. As can be seen from FIG. 6, the forward-facing surface 42 has a recess within which one end of the helical spring 48 is received. In an alternative, the forward-facing surface 42 can have a protrusion about which the helical spring 48 is located.

A circumferential seal 52 is provided radially exterior to the generally cylindrical portion 46 of the valve member 32. The circumferential seal 52 seals the chamber 34 from the fuel passage 28. In the embodiment shown in FIGS. 6 and 7, the circumferential seal 52 is located on an interior portion of the chamber wall 36.

In the embodiment shown in FIGS. 6 and 7, the chamber wall 36 is disposed centrally across a width of the fuel passage 28. This allows for even flow of fuel around the chamber wall 36 (see arrow 54 in FIG. 7). This assists in maintaining the stability of the drogue assembly during refuelling. The chamber wall 36 comprises a surface 56 facing the fuel passage 28 which is shaped so as to minimise disturbance to fuel flowing through the fuel passage 28 and around the chamber wall 36. The surface 56 of the chamber wall 36 has a smooth profile in the current embodiment. In the embodiment shown in FIGS. 6 and 7, the surface 56 of the chamber wall 36 is chamfered.

When the hose and drogue arrangement, comprising the drogue assembly 6, or the tanker aircraft 2 comprising the hose and drogue arrangement, comprises the reception coupling 12' embodying the present invention, the hose and drogue arrangement, or the tanker aircraft 2, also embody the present invention.

The invention claimed is:

1. A reception coupling for air-to-air refuelling comprising:
    a main body comprising a fuel passage for allowing fuel to flow through the reception coupling and a valve member which is movable, under action of a receiver aircraft probe, in an upstream direction from a first position in which the fuel passage is closed to a second position in which the fuel passage is open for allowing air-to-air refuelling, and
    a chamber defined by a chamber wall, which chamber is separate from the fuel passage and within which a portion of the valve member can be accommodated as the valve member moves towards the second position, so shielding said portion of the valve member from effects of pressure in the fuel passage which would tend to resist movement of the valve member towards the second position;

wherein the chamber wall comprises at least one aperture and the chamber is in fluid communication with the atmosphere via at least one channel extending between the aperture and the atmosphere;

wherein the chamber is vented by the aperture, allowing fluid to move out of the chamber as the portion of the valve member moves into the chamber.

2. A reception coupling for air-to-air refuelling as claimed in claim 1, wherein the chamber wall is mounted in the fuel passage by at least one radially extending arm, and the channel passes through the radially extending arm.

3. A reception coupling for air-to-air refuelling as claimed in claim 1, wherein the valve member comprises a sleeve valve.

4. A reception coupling for air-to-air refuelling as claimed in claim 1, wherein part of the portion of the valve member is accommodated within the chamber in the first position.

5. A reception coupling for air-to-air refuelling as claimed in claim 1, further comprising a first seal to seal the chamber from the fuel passage, the first seal being disposed on one of the valve member and the chamber wall and arranged to seal against the other of the valve member and the chamber wall.

6. A reception coupling for air-to-air refuelling as claimed in claim 1, wherein a surface of the chamber wall facing the fuel passage is shaped to minimize disturbance to fuel flow through the fuel passage.

7. A reception coupling for air-to-air refuelling as claimed in claim 6, wherein a portion of the surface of the chamber wall facing the fuel passage has a smooth profile.

8. A reception coupling for air-to-air refuelling as claimed in claim 6, wherein a portion of the surface of the chamber wall facing the fuel passage is chamfered.

9. A reception coupling for air-to-air refuelling as claimed in claim 1, where in the reception coupling comprises a biasing means for biasing the valve member towards the first position, wherein the biasing means is a helical spring disposed in the chamber and is arranged to act between an inner surface of the chamber wall and a surface of the valve member facing the chamber.

10. A reception coupling for air-to-air refuelling as claimed in claim 9, wherein the biasing means is mounted to the chamber wall within the chamber.

11. A reception coupling for air-to-air refuelling as claimed in claim 9, wherein the surface of the valve member facing the chamber comprises a recessed portion for locating the biasing means on the surface of the valve member.

12. A reception coupling for air-to-air refuelling as claimed in claim 9, wherein the surface of the valve member facing the chamber comprises a protruding portion for locating the biasing means on the surface of the valve member.

13. A reception coupling for air-to-air refuelling as claimed in claim 1 wherein the chamber wall is disposed in, but is separate from, the fuel passage.

14. A reception coupling for air-to-air refuelling as claimed in claim 1 wherein there is no fluid communication between the chamber and the fuel passage.

15. A reception coupling for air-to-air refuelling as claimed in claim 1 wherein the chamber wall is disposed centrally across a width of the fuel passage.

16. A reception coupling air-to-air refuelling as claimed in claim 1 wherein the chamber wall comprises a surface facing the fuel passage which is shaped so as to minimize disturbance to fuel flowing though the fuel passage and around the chamber wall.

17. A hose and drogue arrangement for air-to-air refuelling comprising a reception coupling according to claim 1.

18. A tanker aircraft comprising a hose and drogue arrangement for air-to-air refuelling, the hose and drogue arrangement comprising a reception coupling according to claim 1.

19. A reception coupling for air-to-air refuelling comprising:

a main body comprising a fuel passage for allowing fuel to flow through the reception coupling and a valve member which is movable, under action of a receiver aircraft probe, in an upstream direction from a first position in which the fuel passage is closed to a second position in which the fuel passage is open for allowing air-to-air refuelling, a chamber defined by a chamber wall, which chamber is separate from the fuel passage and within which a portion of the valve member can be accommodated as the valve member moves towards the second position, so shielding said portion of the valve member from effects of pressure in the fuel passage which would tend to resist movement of the valve member towards the second position, and wherein the reception coupling comprises at least one radially extending arm and the chamber wall is mounted within the fuel passage by the at least one radially extending arm, the at least one radially extending arm comprises at least one channel passing therethrough, and the chamber wall comprises an aperture, through which aperture the chamber is in fluid communication with the at least one channel, and wherein the at least one channel is in fluid communication with the atmosphere.

20. A reception coupling for air-to-air refuelling according to claim 19 wherein said at least one radially extending arm extends across but does not block the fuel passage.

* * * * *